US012809950B2

(12) United States Patent
Ranganathan et al.

(10) Patent No.: US 12,809,950 B2
(45) Date of Patent: Nov. 24, 2026

(54) METHODS AND SYSTEMS TO IDENTIFY MEDIA CONTENT USING WATERMARK METADATA AND MAPPED AUDIO SIGNATURES

(71) Applicant: The Nielsen Company (US), LLC, New York, NY (US)

(72) Inventors: Raghuram Ranganathan, Odessa, FL (US); Kevin Rini, Tampa, FL (US); Joseph Wyatt Brewer, Spring Hill, FL (US); James Petro, Dunedin, FL (US); Sandeep Tapse, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/826,181

(22) Filed: Sep. 6, 2024

(65) Prior Publication Data

US 2025/0086256 A1 Mar. 13, 2025

Related U.S. Application Data

(60) Provisional application No. 63/581,579, filed on Sep. 8, 2023.

(51) Int. Cl.
*G06F 21/16* (2013.01)
*H04N 21/8358* (2011.01)

(52) U.S. Cl.
CPC ......... *G06F 21/16* (2013.01); *H04N 21/8358* (2013.01)

(58) Field of Classification Search
None
See application file for complete search history.

(56) References Cited

U.S. PATENT DOCUMENTS 11,317,128 B1 * 4/2022 Perkalsky ........ H04N 21/23605
2012/0078864 A1 * 3/2012 Li ...................... H04N 21/8358
707/E17.007

(Continued)

OTHER PUBLICATIONS

England, P., Malvar, H.S., Horvitz, E., Stokes, J.W., Fournet, C., Burke-Aguero, R., Chamayou, A., Clebsch, S., Costa, M., Deutscher, J. and Erfani, S., Jul. 2021. AMP: Authentication of media via provenance. In Proceedings of the 12th ACM Multimedia Systems Conference (pp. 108-121). (Year: 2021).*

(Continued)

*Primary Examiner* — Luu T Pham
*Assistant Examiner* — Edward X Long

(57) ABSTRACT

Examples described herein include methods and computing systems which may include examples of mapping watermark metadata to tagged signatures and matching those tagged signatures to mapped reference signatures. A tagged signature is a signature that is identified using a mapping of watermark metadata. The mapping to watermark metadata of a tagged signature (e.g., having stored data associated with the tagged signature) can include the use of a source identifier (e.g., a station identification), timestamps, a media asset identifier, and a time-in-content range. Computing systems are employed to identify media content using matched reference signatures, thereby also facilitating crediting of media content. For example, an audience measurement entity can credit media content streams as having been viewed by an audience using such tagged signature.

17 Claims, 6 Drawing Sheets

(56) References Cited

U.S. PATENT DOCUMENTS

| | | | | |
|---|---|---|---|---|
| 2014/0074712 | A1* | 3/2014 | Palmer | G06Q 30/06 705/300 |
| 2021/0390447 | A1* | 12/2021 | Cheruvu | G06N 20/00 |
| 2024/0214627 | A1* | 6/2024 | Carney Landow | H04N 21/25816 |
| 2024/0221000 | A1* | 7/2024 | Siu | G06F 21/16 |

OTHER PUBLICATIONS

Liu, X., Xu, R. and Chen, Y., 2025. Securing Digital Media Integrity: A Survey of Watermarking and Manipulation Detection for Image Authentication. Authorea Preprints. (Year: 2025).*

* cited by examiner

METHODS AND SYSTEMS TO IDENTIFY MEDIA CONTENT USING WATERMARK METADATA AND MAPPED AUDIO SIGNATURES

BACKGROUND

Media identification systems utilize a variety of techniques to identify media (e.g., television (TV) programs, radio programs, advertisements, commentary, audio/video content, movies, commercials, advertisements, web pages, and/or surveys, etc.). In some media identification systems, a code is inserted into the audio and/or video of a media program. For example, a code can be encoded within an audio signal of the media program as an audio watermark. That audio watermark may be psycho-acoustically masked so that the code is imperceptible to human hearers of the audio. The code may be later detected by the media identification system when the media program is presented.

Media identification systems may additionally or alternatively generate signatures at one or more monitoring sites from some aspect of media (e.g., the audio and/or the video). A signature is a representation of a characteristic of the media (e.g., the audio and/or the video) that identifies the media or a part thereof. For example, a signature may be computed by analyzing blocks of audio samples for their spectral energy distribution and determining a signature that characterizes the energy distribution of selected frequency bands of the blocks of audio samples. The media identification systems then identifies the media by comparing the signatures generated from the media against a reference database of signatures previously generated from known media.

DETAILED DESCRIPTION

Figure 1:
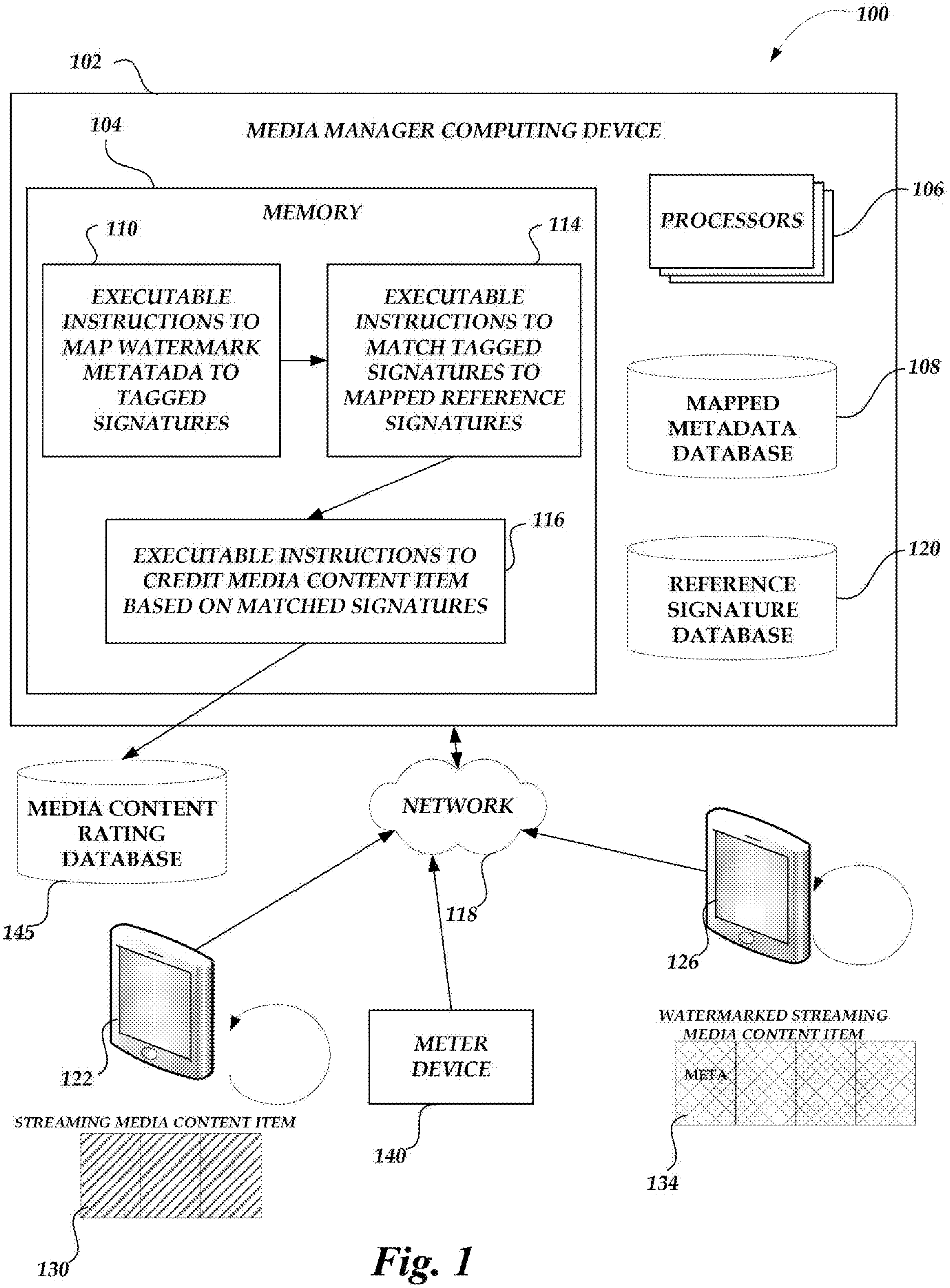
FIG. 1 is a schematic illustration of a system arranged in accordance with examples described herein.

Examples described herein include methods and computing systems which may include examples of mapping watermark metadata to "tagged signatures" and matching those "tagged signatures" to mapped reference signatures. As described herein, a "tagged signature" is a signature that is identified using a mapping of watermark metadata. The mapping to watermark metadata of a tagged signature (e.g., having stored data associated with the tagged signature) can include the use of a source identifier (e.g., a station identification), timestamps, a media asset identifier, and a time-in-content range. Because signatures can be used to identify media content, in identifying the signature via watermark metadata, media content can be identified, with reduced computational expense as compared to conventional signature matching used to identify media content items. Computing systems are employed to identify media content using matched reference signatures, thereby also facilitating crediting of media content. For example, an audience measurement entity can credit media content streams as having been viewed by an audience using such tagged signatures.

In an example process, a system (e.g., media manager computing device) can obtain a media content item with identification information including watermark data and one or more signatures. The watermark data has a source identifier and a plurality of timestamps associated with the media content. The system can map the source identifier and a duration based on the plurality of timestamps to each of the one or more signatures as a respective tagged signature of one or more tagged signatures. Each tagged signature has a mapped source identifier and a mapped duration, respectively. The system can compare a mapped source identifier and a mapped duration of at least one of the one or more tagged signatures to a mapped reference source identifier and a mapped reference duration of one or more reference signatures. The system can then determine that at least one of the one or more tagged signatures match one of the one or more reference signatures to identify those one or more tagged signatures as one or more matched signatures.

Generally, signatures captured from media content can be more reliably compared with reference signatures to identify the media content. However, comparing reference signature in this way can incur significant computational expense due to the number of reference signatures being compared. For example, a media manager computing device (e.g., a server computing device) at an audience measurement entity can generate, store, index, and compare against numerous (e.g., hundreds or thousands) of reference signatures, thereby using a large amount of memory and processors. At the same time, the audience measurement entity can be receiving numerous media content streams of media content items from content providers and content consumers, which also use a large amount of memory and processors. The audience measurement entity can compare the reference signatures with the received media streams to provide a ratings credit for viewing of media content items by media content consumers. Accordingly, such comparisons of numerous reference signatures with numerous signatures from media content streams can incur significant computational expense. Methods and computing systems described herein reduce the computational expense to identify media content items using reference signatures.

Moreover, the use of a media manager computing device to compare signatures may involve additional computational expense due to the computational time at their processors. For example, when comparing reference signatures to captured signatures of viewed media content items from multiple content consumers, use of server computing devices may be further compounded because the already-burdensome signature comparison process may need to be performed for numerous media content streams. Accordingly, identifying media using signature matching can incur significant computationally expense because it includes the generation of the signatures (e.g., a hashed signature), storage of the signatures, and a signature comparison. And comparing signatures, over time, can physically degrade the server computing devices due to the cumulative computational time, which can lead to additional server computing devices being installed and maintained by the personnel of the audience measurement entity. As described herein, using mapped reference signatures may reduce a computational expense of the media manager because the mapping of the reference signatures can facilitate a lookup of the database in a particular partition of the database (e.g., a local cache), as compared to searching the entire reference signatures database, thereby reducing the computational time to credit media content items. In accordance with examples described herein, the methods and computing systems avoid the disadvantages of computationally-expensive reference signature comparisons that increase computational time at the server computing devices at an audience measurement entity.

An audience measurement entity can credit media content streams as having been viewed by an audience using watermarks, signatures, or, as described herein, using "tagged signatures." While watermarks can be used to credit media content items for media content providers (e.g., traditional television broadcasters) who can participate in inserting the audio watermark into their media content, crediting of streaming media content provided by media content providers by audience measurement entities may also involve the use of reference signatures. For example, an audience measurement entity may provide ratings that credit both watermarked and non-watermarked content and may need a uniform method to provide ratings for all media content items, whether watermarked or not. For example, increasingly, media content is provided by additional entities than traditional media content providers. And such media content may be presented on various types of computing devices, such as a smartphone device. There is a need to account for viewing of media content items uniformly, regardless of whether the media content items include watermark data. Accordingly, the methods and computing systems described herein facilitate crediting of media content using mapped metadata of reference signatures while also reducing the computational expense of identifying media content at a media manager computing system.

FIG. 1 is a schematic illustration of a system 100 arranged in accordance with examples described herein. System 100 includes a media manager computing device 102, a network 118, user computing device 122, and user computing device 126. The media manager computing device 102 obtains identification information indicative of media content streams, some of which may be watermarked, from user computing device 122 and user computing device 126 via the network 118. Media content streams include one or more media content items. A media content item may be a particular portion of a media content program (e.g., a show in a series of content programs or a portion of a movie) or all of a media content program (e.g., the entire show or movie). The watermarked data can include certain parameters provided as metadata when a media content item is watermarked, e.g., when an audio watermark is inserted into the media content stream by a media content provider. The parameters can include a source identifier (e.g., a station identification ("SID")), a timestamp, and media asset identifier. For certain media content items, watermarked data can include a time-in-content range. The time-in-content ("TIC") range can be referred to as a duration of the media content item. The time-in-content range may be calculated based on the timestamps included in a watermarked media content item. For example, the time-in-content range may be a content portion(s) of show in a series of content presented between advertisements. In an example implementation, watermark data may be inserted into watermarked streaming media content item 134 as an ID3 tag format into a Moving Picture Experts Group (MPEG) content stream. Accordingly, in the example implementation, the ID3 tag may include watermark metadata encoded with extensible markup language (XML).

The media manager computing device 102 includes memory 104, processor(s) 106, mapped metadata database 108, and reference signature database 120. The memory 104 may store, as encoded, one or more sets of executable instructions that, when executed by processor(s) 106, cause the media manager computing device 102 to perform various operations. Such operations may provide, when executed by the processor(s) 106, mapped metadata, matched signatures, or a media rating for a media content item (e.g., crediting a duration portion of the media rating). The executable instructions are encoded on the memory 104 and include executable instructions to map watermark metadata to tagged signatures 110, executable instructions to match tagged signatures to mapped reference signatures 114, and executable instructions to credit media content item based on matched signatures 116.

The memory 104, mapped metadata database 108, reference signature database 120, and media content rating database 145 may be computer-readable media. For example, computer-readable media may include both non-transitory computer storage media and communication media including any medium that facilitates transfer of a computer program (e.g., a set of executable instructions) from one place to another. Any of the databases 108, 120, 145 may be implemented as a look-up table (LUT). In some implementations, memory 104, mapped metadata database 108, and reference signature database 120 may reside on the same computer-readable media. Additionally or alternatively implementations, memory 104, mapped metadata database 108, reference signature database 120, and media content rating database 145 may reside on the same computer-readable media.

In examples described herein, the executable instructions to map watermark metadata to tagged signatures 110 include operations to provide a mapped source identifier and a mapped duration. For example, as described below with respect to method 200, when executable instructions to map watermark metadata to tagged signatures 110 are executed by processor(s) 106, the media manager computing device 102 performs operations to map a source identifier and a duration to one or more signatures associated with the watermarked streaming media content item 134.

In mapping the watermark data to tagged signatures, the executable instructions to map watermark metadata to tagged signatures 110 include operations to associate a SID and a TIC range with each obtained signature of the watermarked streaming media content item 134. For example, the executable instructions to map watermark metadata to tagged signatures 110 may include operations to perform the method 200, such that watermark metadata and obtained signatures of the watermarked streaming media content item 134 are mapped and stored in a look-up table of the mapped metadata database 108. In executing the method 200, the executable instructions to map watermark metadata to tagged signatures 110 can perform operations to associate a SID and a TIC range with each obtained signature of the watermarked streaming media content item 134. For example, one or more obtained signatures of the watermarked streaming media content item 134 can be associated with a particular SID and a particular TIC range if the obtained signatures include timestamps that fall within the TIC range.

Continuing in the description of media manager computing device 102 being caused to perform certain operations, mapped metadata (e.g., mapped to the tagged signatures) also can be utilized by the media manager computing device 102 to perform certain operations. The media manager computing device 102 can perform operations to match tagged signatures to mapped reference signatures. For example, as described below with respect to method 200, when executable instructions to match tagged signatures to mapped reference signatures 114 are executed by processor(s) 106, the media manager computing device 102 performs operations to match tagged signatures (e.g., those associated with watermarked streaming media content item 134) to mapped reference signatures. In some implementations, as depicted in FIG. 1, the outputs from the execution of executable instructions to map watermark metadata to tagged signatures 110 may be provided for the execution of executable instructions to match tagged signatures to mapped reference signatures 114. In the example implementations, once the executable instructions to map watermark metadata to tagged signatures 110 are executed, the media manager computing device 102 is caused to provide the mapped metadata (e.g., a mapped source identifier and mapped duration) to the executable instructions to match tagged signatures to mapped reference signatures 114. Accordingly, the media manager computing device 102 can provide such mapped metadata for comparison to mapped reference metadata, which may reduce the computational expense used to identify media content items when using reference signatures.

In mapping the watermark data to tagged signatures, the executable instructions to match tagged signatures to mapped reference signatures 114 include operations to compare a mapped source identifier and a mapped duration to mapped reference source identifiers and mapped reference durations stored in the mapped metadata database 108. The executable instructions to match tagged signatures to mapped reference signatures 114 can include operations to compare mapped duration values associated with a matched mapped source identifier in a local cache of the media manager computing device 102. Once matched, additional operations can include determining that the mapped source identifier and mapped duration of the watermarked streaming media content item 134 are matched with a particular reference signature(s) stored in the reference signature database 120 and to identify the media content item with a media content identifier associated with at least one of the matched signatures.

The media manager computing device 102 can perform operations to credit a media content item based on matched signatures. For example, as described below with respect to method 300, when executable instructions to credit media content item based on matched signatures 116 are executed by processor(s) 106, the media manager computing device 102 performs operations to credit the streaming media content item 130 or watermarked streaming media content item 134 based on the mapped signatures. Once executable instructions to credit media content item based on matched signatures 116 are executed, the media manager computing device 102 can be caused to provide an output that indicates a media rating associated with a duration portion of associated with the media content item (e.g., watermarked streaming media content item 134) is to be stored in the media content rating database 145. In some implementations, as depicted in FIG. 1, the outputs from the execution of executable instructions to match tagged signatures to mapped reference signatures 114 can be provided for the execution of executable instructions to credit media content item based on matched signatures 116. In the example implementations, once the executable instructions to match tagged signatures to mapped reference signatures 114 are executed, the media manager computing device 102 is caused to provide an output indicative of matched signatures for the streaming media content item 130 or watermarked streaming media content item 134 to the executable instructions to credit media content item based on matched signatures 116. Accordingly, the media manager computing device 102 can provide crediting of media content items (e.g., for a media rating of the media content item), which may facilitate crediting of media content using mapped metadata of reference signatures while also reducing computational expense at a media manager computing device 102.

The media manager computing device 102 obtains identification information indicative of a streaming media content item 130 from user computing device 122 via network 118. The streaming media content item 130 can be a portion of a portion of a media content program (e.g., a show in a series of content programs or a portion of a movie) or all of the media content program (e.g., the entire show or movie). Some media content providers can provide a streaming "video-on-demand" service or the like where media content consumers may select that certain media content is to be presented (e.g., in contrast to a schedule on broadcast television channel). In the example, a user of the user computing device 122 (e.g., a media content consumer) may be accessing a streaming media content application on their smartphone (e.g., Netflix, Max, Hulu, Disney+) and can select that certain media content be presented on the user computing device 122 as the streaming media content item 130.

Once certain media content is presented, the user computing device 122 can generate and/or transmit identification information indicative of the media content item(s) presented on the user computing device 122. For example, the user computing device 122 can have a software application installed that monitors and/or detects audio signal(s) included in the streaming media content 130. Using the software application, the user computing device 122 can extract signatures from the audio signal(s) to be provided as identification information indicative of streaming media content item 130 or extract portions of the audio signal (or all of audio signal) to be provided as identification information indicative of media content item 130.

In some examples, a meter device 140 monitors the user computing device 122 to detect audio signal(s) when media content is presented on the user computing device 122. In such examples, the meter device may generate and/or transmit the identification information indicative of the streaming media content item 130 presented on the user computing device 122 via the network 118 to the media manager computing device 102. The meter device 140 may use a microphone of the meter device 140 detect an audio signal of the streaming media content item 130 and transmit a portion or all of the audio signal as identification information indicative of the streaming media content item 130 to the media manager computing device 102 via the network 118. The meter device 140 can extract or generate signatures from the audio signal(s) to be provided as identification information indicative of the streaming media content item 130. Generally described, the meter device 140 can monitor audio, video and/or images of a media presentation device and collect media identification information embedded in (or generated based on) the audio, video, and/or images of the media content stream which may include one or more media content items. For example, the media identification data can be collected by, for example, listening for audio presented within an environment of the meter 140 with a microphone and/or by capturing images of a video presented on the media presentation device via a camera or sensor. In some examples, the meter device 140 is one or more of a panelist meter or a device with panelist software (e.g., a mobile phone, personal digital assistant, computer, etc.).

The media manager computing device 102 also can obtain identification information indicative of a watermarked streaming media content item 134 from user computing device 126 via the network 118. The watermarked streaming media content item 134 may be a portion of a portion of a media content program (e.g., a show in a series of content programs or a portion of a movie) or all of the media content program (e.g., the entire show or movie). Some media content providers that provide a streaming "video-on-demand" service or the like may also present that media content on a schedule, such as on a broadcast television or cable television channel. Often, when the media content is first presented on a channel, a code is inserted into the media content (e.g., a media program) into the audio and/or video of the media content. For example, a code can be encoded within an audio signal of the watermarked media content item 134 as a watermark. Accordingly, that same media content, including the watermark, can also be presented through a streaming "video-on-demand" service or the like because the media content has been recorded and stored in a server of the media content provider with that watermarked format.

Once watermarked streaming media content 134 is presented on the user computing device 126, the user computing device 126 can generate and/or transmit identification information indicative of the media content item(s) presented on the user computing device 126, e.g., using a software application installed on the user computing device 126. In the example of FIG. 1, when a user of the user computing device 126 accesses a streaming content application on their smartphone (e.g., Peacock, CNN Live, ABC News), the user can select that certain media content to be presented on the user computing device 122 as the watermarked streaming media content item 134. The user computing device 126 can have a software application installed that monitors and/or detects audio signal(s) included in the watermarked streaming media content 134. Using the software application, the user computing device 126 can extract codes embedded in the audio signal(s) of the watermarked media content item 134, including any watermark metadata.

In some examples of audio watermark encoding, the code is psycho-acoustically masked so that the code is imperceptible to human hearers of the audio signal. The codes can include and/or be representative of any additional information such as, for example, a channel identifier, a station identifier, a program identifier, a timestamp, a broadcast identifier, or a media asset identifier. As used herein, such additional information included in the codes may be referred to as watermark metadata, e.g., such as the depicted "meta" data portion of the watermarked streaming media content item 134. The codes can be symbols that were converted and are represented as audio signals(s). For example, the codes or symbols representative of the codes can be embedded by adjusting (e.g., emphasizing or attenuating) selected frequencies in an audio signal. Any suitable encoding and/or error correcting technique may be used to convert codes into symbols.

Additionally or alternatively, using the software application, the user computing device 126 can also extract signatures from the audio signal(s) to be provided as identification information indicative of the watermarked media content item 134 or extract portions of the audio signal (or all of audio signal) to be provided as identification information indicative of the watermarked media content item 134.

In some examples, a meter device 140 monitors the user computing device 126 to detect audio signal(s) when media content is presented on the user computing device 126. In such examples, the meter device can generate and/or transmit the identification information indicative of the watermarked streaming media content item 134 presented on the user computing device 126 via the network 118 to the media manager computing device 102. The meter device 140 can use a microphone of the meter device 140 detect an audio signal of the watermarked streaming media content item 134 and transmit a portion or all of the audio signal as identification information indicative of the watermarked streaming media content item 134 to the media manager computing device 102 via the network 118. The meter device 140 can extract codes embedded in the watermarked streaming media content item 134, including any watermark metadata or generate signatures from the audio signal(s) to be provided as identification information indicative of the watermarked streaming media content item 134. For example, the meter device 140 can also extract or generate signatures from the audio signal(s) to be provided as identification information indicative of the streaming media content item 134. Advantageously, while the meter device 140 can extract or generate signatures for the watermarked streaming media content item 134, the system 100 can utilize the watermark metadata extract from the codes embedded in the watermarked streaming media content item 134 to identify the watermarked streaming media content item 134. For example, the media manager computing device 102 can utilize the watermark metadata, in executing the executable instructions to map watermark metadata to tagged signatures 110 and the executable instructions to match tagged signatures to mapped reference signatures 114, to identify the watermarked streaming media content item 134; thereby avoiding the disadvantages of computationally expensive reference signature comparison methods and systems which can increase computational expense at the media manager computing device 102.

In some examples, the media manager computing device 102 can obtain watermarked content items, including watermark data, from media content providers. The watermarked content items can be used by the media manager computing device 102 to generate signatures and map watermark data. For example, the media manager computing device 102 can execute executable instructions to map watermark metadata to tagged signatures 110, as executed by processor(s) 106, to perform operations that map metadata, such as a source identifier (e.g., a SID) and one or more timestamps, to certain portions or all of watermarked media content items obtained by the media manager computing device 102. An initial timestamp may be referred to as a starting time-in-content ("TIC"). The last timestamp (e.g., the highest value of timestamps obtained) may be referred to as an ending TIC. A TIC range may be calculated by the difference of the starting TIC and the ending TIC. The TIC range can be the duration of the watermarked streaming media content item 134.

The media manager computing device 102 can obtain reference watermark data regarding watermarks included in media content streams by media content providers from reference signature database 120 or any database external to the media manager computing device 102. For example, media manager computing device 102 may obtain reference watermark data from a database or LUT where reference watermark data is stored by external media content providers and accessible to media manager computing device 102. Continuing in the example, reference watermark metadata (e.g., a source identifier and time-in-content range) obtained from an external database or LUT can be mapped to reference tagged signatures obtained from the same external database or LUT (e.g., by executing the executable instructions to map watermark metadata to tagged signatures 110). The mapped reference watermark metadata can be stored in the mapped metadata database 108. For example, the mapped metadata database 108 can be a look-up table having mappings of metadata associated with a media asset identifier. The media asset identifier can be an identifier that the media manager computing device 102 uses to identify media assets and provide media content ratings associated with that media asset (e.g., as stored in media content rating database 145). As mapped in the mapped metadata database 108, the reference watermark metadata can include references (e.g., pointers) to reference signatures of the watermarked media content items. The reference signatures that are mapped to the reference watermark metadata may be stored in the reference signature database 120.

Advantageously, system 100, which utilizes watermark metadata that is mapped to tagged signatures to identify watermarked streaming media content items 134, may reduce a computational expense of the media manager computing device 102 because the mapping of the reference signatures can facilitate a lookup of the reference signature database 120 in a particular partition (e.g., a local cache), as compared to searching the entire reference signatures database 120, thereby reducing the computational time, system 100 may reduce the computational time needed to identify watermarked streaming media content items 134, e.g., as compared to the computational time to search reference signature database 120 using signatures comparison methods alone. For example, when a streaming media content item 130—which does include a watermark audio signal—and a watermarked streaming media content item 134—which includes a watermark audio signal—system 100, implementing the media manager computing device 102, uses less computational time to identify the watermarked streaming media content item 134 than the computational time used to identify the streaming media content item 130. Thereby, the system 100 avoids some of the disadvantages of computationally-expensive reference signature comparison methods and systems which can increase computational time, e.g., when the media manager 102 utilizes only the reference signature and reference signature database 120 to identify media content.

Figure 2:
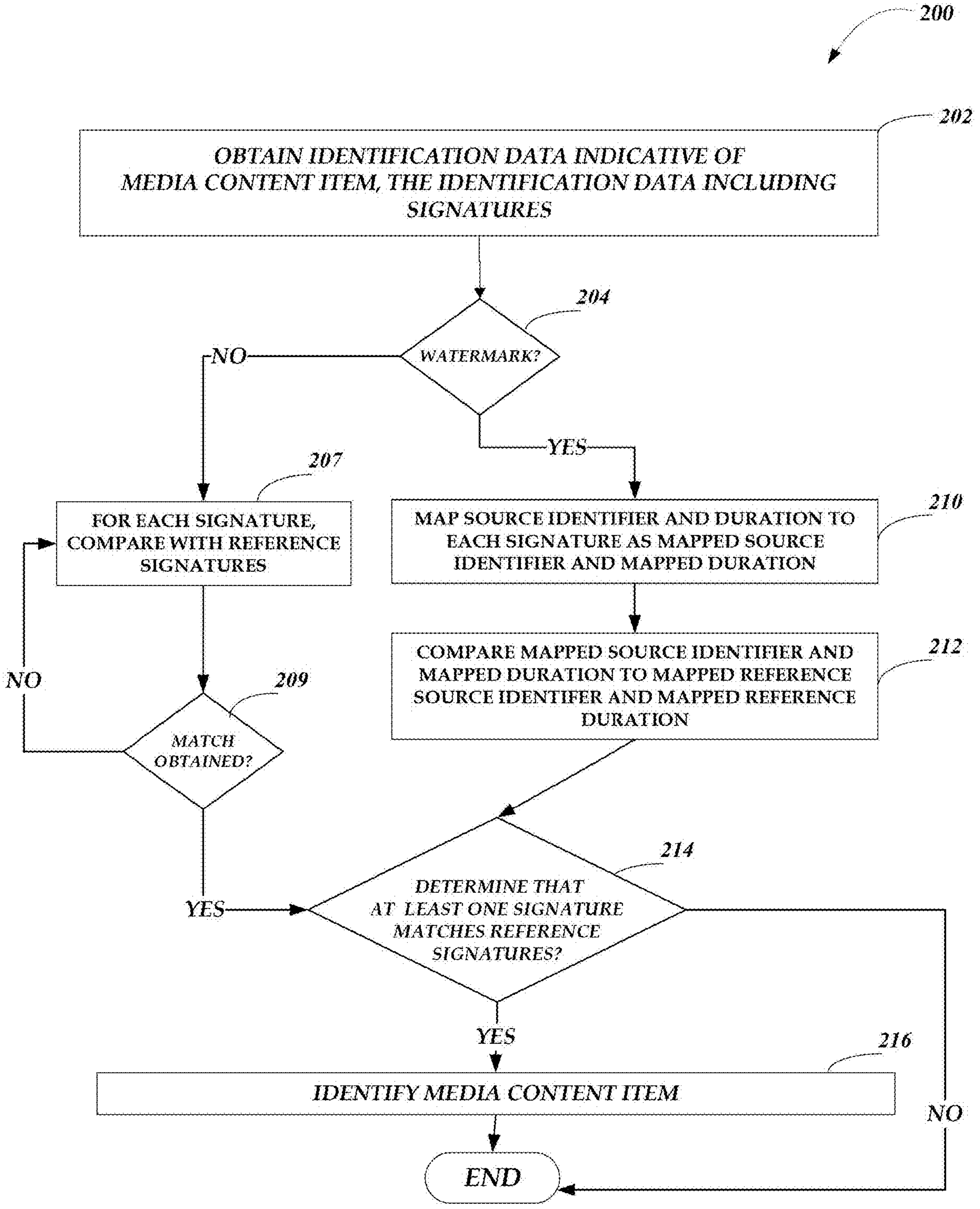
FIG. 2 is a schematic illustration of a method arranged in accordance with examples described herein.

FIG. 2 is a schematic illustration of a method 200 arranged in accordance with examples described herein. The method 200 may be implemented by any of the systems or computing devices described herein or combinations thereof. The method 200 starts at step 202. At step 202, a computing device, implementing method 200, obtains identification data indicative of a media content item. For example, as described with respect to FIG. 1, in a system 100, a media manager computing device 102 obtains a streaming media content item 130 and a watermarked streaming media content item 134. The media content item is a portion of media content that is streaming over a network. The media content item may be part of a media content stream, such as streaming video-on-demand provided by a media content provider.

At step 202, in some implementations, a media manager computing device 102, implementing method 200, obtains identification information (e.g., identification data) indicative of media content items from various sources, for example, user computing device 122, user computing device 126, and meter device 140. It can be appreciated that media content items may be obtained from various sources that may present streaming media content, for example, a smartphone, a tablet computing device, an Internet-connected television, a streaming computing device, or generally any computing device configured to present media content streams. The obtained identification information indicative of a media content item can include one or more signatures extracted from an audio signal of the media content item. For example, a software application on user computing device 122 or user computing device 126 can extract one or more signatures from a streaming media content item 130 or watermarked streaming media content item 134, respectively. As another example, the meter device 140 can extract and/or generate signatures from detected audio signals of the user computing device 122 or user computing device 126. For watermarked streaming media content items, the obtained identification information indicative of a media content item can include watermark data extracted from a watermark code in an audio signal of a media content items. For example, the watermark data can include a SID and one or more timestamps, such a starting TIC and an ending TIC indicative of a TIC range.

At step 204, the method 200 determines whether the obtained identification information includes watermark data. In some implementations, a media manager computing device 102, implementing method 200, determines whether the obtained identification information indicative of the media content item includes watermark metadata. For example, the media manager computing device 102 can analyze identification information for any metadata. In the example, an ID3 tag decoder can determine whether an XML file including the watermark metadata was obtained in the identification information. In some examples of watermarked streaming media content item 134, as described, both signatures indicative of the watermarked streaming media content item 134 and watermark metadata may be obtained. When the media manager computing device 102 determines that the obtained identification information includes watermark metadata, the flow of method 200 proceeds along the YES route to step 210.

Alternatively, if the media manager computing device 102 determines that the obtained identification information does not include watermark metadata, the flow of method 200 proceeds along the NO route to step 207. In various implementations, obtained identification information of a streaming media content item 130 may not include watermark metadata. Accordingly, the obtained identification information may include only signatures indicative of the streaming media content item 130. In such cases, the flow of method 200 proceeds through step 207 and 209 using a signature comparison method.

At step 207 of the method 200, a media manager computing device 102 can compare the obtained signatures of the streaming media content item 130 to one or more reference signatures. In some examples, the media manager computing device 102 compares the obtained signatures of the streaming media content item 130 to reference signatures stored in the reference signature database 120. For example, a comparator implemented at the media manager computing device 102 can compare an individually obtained signature of the streaming media content item 130 to individually stored signatures in a look-up table of the reference signature database 120. The comparator can iterate through the obtained signatures of the streaming media content item 130 and look-up table until a match is obtained. At step 209, the media manager computing device 102 determines whether one of the obtained signatures of the streaming media content item 130 matches a reference signature. When a comparator or signature comparison process, implemented by processor(s) 106, outputs an indication that a match has been obtained, the flow of method 200 proceeds along the YES route to step 214. A match of reference signature, at step 209, may occur within a local cache of the media manager computing device 102, for example, if the media manager computing device 102 was generating reference signatures for the streaming media content item 130, but had not yet indexed the generated reference signatures with a media asset identifier in the reference signature database 120. As described, the reference signature comparison process for signatures of a streaming media content item 130 can increase computational time of the reference signature database 120. Advantageously for watermarked streaming media content items, like watermarked streaming media content item 134, the flow of method 200 may proceed along the aforementioned YES route to step 210.

At step 210, because the media manager computing device 102 has determined that the obtained identification information includes watermark metadata (e.g., at step 204), the processor(s) 106 of the media manager computing device 102 can execute the executable instructions to map watermark metadata to tagged signatures 110. Step 210 of the method 200 may be performed for any watermarked streaming media content item 134. Accordingly, when the processor(s) 106 execute the executable instructions to map watermark metadata to tagged signatures 110, the media manager computing device 102 performs operations to map a source identifier and a duration, derived from the watermark metadata, to each obtained signature of the watermarked streaming media content item 134 as a mapped source identifier and a mapped duration respectively. For example, the executable instructions to map watermark metadata to tagged signatures 110 may include operations to associate a SID and a TIC range with each obtained signature of the watermarked streaming media content item 134. As executed by the processor(s) 106 of the media manager computing device 102, the association of a SID and a TIC range for each obtained signature is stored in a look-up table of the mapped metadata database. In the examples, one or more obtained signatures of the watermarked streaming media content item 134 can be associated with a particular SID and a particular TIC range if the obtained signatures include timestamps that fall within the TIC range. The mappings of the obtained signatures to SID and TIC ranges are stored in the mapped metadata database 108. When such operations have been performed for watermark metadata and the obtained signatures of the watermarked streaming media content item 134, the flow of the method 200 proceeds to step 212.

At step 212, the processor(s) 106 of the media manager computing device 102 can execute executable instructions to match tagged signatures to mapped reference signatures 114. Once the executable instructions to map watermark metadata to tagged signatures 110 are executed at step 210, the media manager computing device 102 is caused to provide the mapped metadata (e.g., a mapped source identifier and mapped duration) to the executable instructions to match tagged signatures to mapped reference signatures 114. Reference signatures, obtained from media content providers by the media manager computing device 102 (e.g., from a database external to media manager computing device 102), are stored in the reference signature database 120. Reference watermark metadata (e.g., a SID and TIC range) obtained from an external database can be mapped to the reference signatures obtained from the same external database by executing the executable instructions to map watermark metadata to tagged signatures 110. Accordingly, the mapped reference watermark metadata may be stored in the mapped metadata database 108 along with the mapped metadata from the obtained watermarked streaming media content item 134. When the processor(s) 106 execute the executable instructions to match tagged signatures to mapped reference signatures 114, the media manager computing device 102 performs operations to match a mapped source identifier and a mapped duration, derived from the watermark metadata of the watermarked streaming media content item 134, to a mapped reference source identifier and a mapped reference duration, respectively. For example, the executable instructions to map watermark metadata to tagged signatures 110 may include operations to compare a mapped source identifier and a mapped duration to mapped reference source identifiers and mapped reference durations stored in the mapped metadata database 108. The media manager computing device 102 may first compare the mapped source identifiers within a local cache, to locate which look-up table in the mapped metadata database 108, the comparison may continue. Once a mapped source identifier is matched through the comparison process, the processor(s) 106 of the media manager computing device 102 may continue to execute executable instructions to match tagged signatures to mapped reference signatures 114, to next compare the mapped duration values associated with the matched mapped source identifier within the local cache of the media manager computing device 102. As an example, if the watermarked streaming media content item 134 is a portion or all of a media content stream presented on Peacock app of a smartphone, the mapped SID value may be matched to NBCUniversal Television and Streaming as the media content provider, and a mapped duration value may be 30 minutes. When a match of both the duration and source identifier have occurred, the flow of method 200 may proceed to step 214.

At step 214, once a match of both the duration and source identifier have occurred, the processor(s) 106 of the media manager computing device 102 can continue to execute executable instructions to match tagged signatures to mapped reference signatures 114, to determine whether a stored reference signature in reference signature database 120 is a reference signature associated with the mapped source identifier and mapped duration that was matched. For example, as mapped in the mapped metadata database 108, a stored mapping of reference watermark metadata can include references (e.g., pointers) to reference signatures of tagged media content items. The reference signatures that are mapped to the reference watermark metadata can be stored in the reference signature database 120. Accordingly, by associating the matched source identifier and matched duration value with a particular reference signature, the media manager computing device 102 can determine that the mapped source identifier and mapped duration of the watermarked streaming media content item 134 are matched with a particular reference signature(s) stored in the reference signature database 120. Accordingly, in obtaining a reference signature for the watermarked streaming media content item 134, advantageously, in executing the method 200, a media manager computing device 102 can provide mapped metadata for comparison to mapped reference metadata, which may reduce the computational expense used to identify media content items, such as the watermarked streaming media content item 134. For example, by executing the executable instructions to map watermark metadata to tagged signatures 110 and the executable instructions to match tagged signatures to mapped reference signatures 114, a reference signature(s) for the watermarked streaming media content item 134 was obtained without using additional computational time at the media manager computing device 102 than may have been used if the reference signature for the watermarked streaming media content item 134 was obtained using steps 207 and 209. In the event that no reference signature was obtained for the matched source identifier and duration (e.g., if no reference signature(s) had been stored for the watermarked media content item 134 that were associated with a media asset identifier), the flow of method 200 proceeds along the NO route from step 214 to end the method 200. If, however, the media manager computing device 102 determines that the mapped source identifier and mapped duration of the watermarked streaming media content item 134 are matched with a particular reference signature(s) stored in the reference signature database 120, then the flow of method 200 proceeds along the YES route from step 214 to step 216.

Alternatively, at step 214, the flow from the YES route of step 209 may also be performed, e.g., for a streaming media content item 130. When, at step 214, a comparator or signature comparison process, implemented by processor(s) 106, outputs an indication that a match has been obtained, the media manager computing device 102 can determine that obtained signature of the streaming media content item 130 is matched with a particular reference signature(s) stored in the reference signature database 120. The flow of method 200 may proceed along the YES route from step 214 to step 216. If, however, there was no reference signature match obtained (e.g., if no reference signature had been stored in the reference signature database 120 that was associated with a media asset identifier), the flow of method 200 proceeds along the NO route from step 214 to end the method 200.

At step 216, having matched particular reference signature(s) stored in the reference signature database 120 for either streaming media content item 130 or watermarked streaming media content item 134, the processor(s) 106 of the media manager computing device 102 can continue to execute executable instructions to match tagged signatures to mapped reference signatures 114, to identify the media content item with a media content identifier associated with at least one of the matched signatures. Generally, signatures that are stored in the reference signature database 120 may include a media asset identifier regarding a media asset with which the signature is associated. Accordingly, once the matched reference signature is determined at step 216, the media manager computing device 102 may be caused to identify a media asset for a given media content item with the associated media asset identifier of the matched signature. The media asset identifier can be used by the media manager computing device 102, to credit a media rating for the media content item, e.g., as implemented by a media manager computing device 102 executing executable instructions to credit media content item based on matched signatures. For example, in implementation depicted in FIG. 1, the outputs from the execution of executable instructions to match tagged signatures to mapped reference signatures 114 can be provided for the execution of executable instructions to credit media content item based on matched signatures 116. The method 200 ends after step 216.

Figure 3:
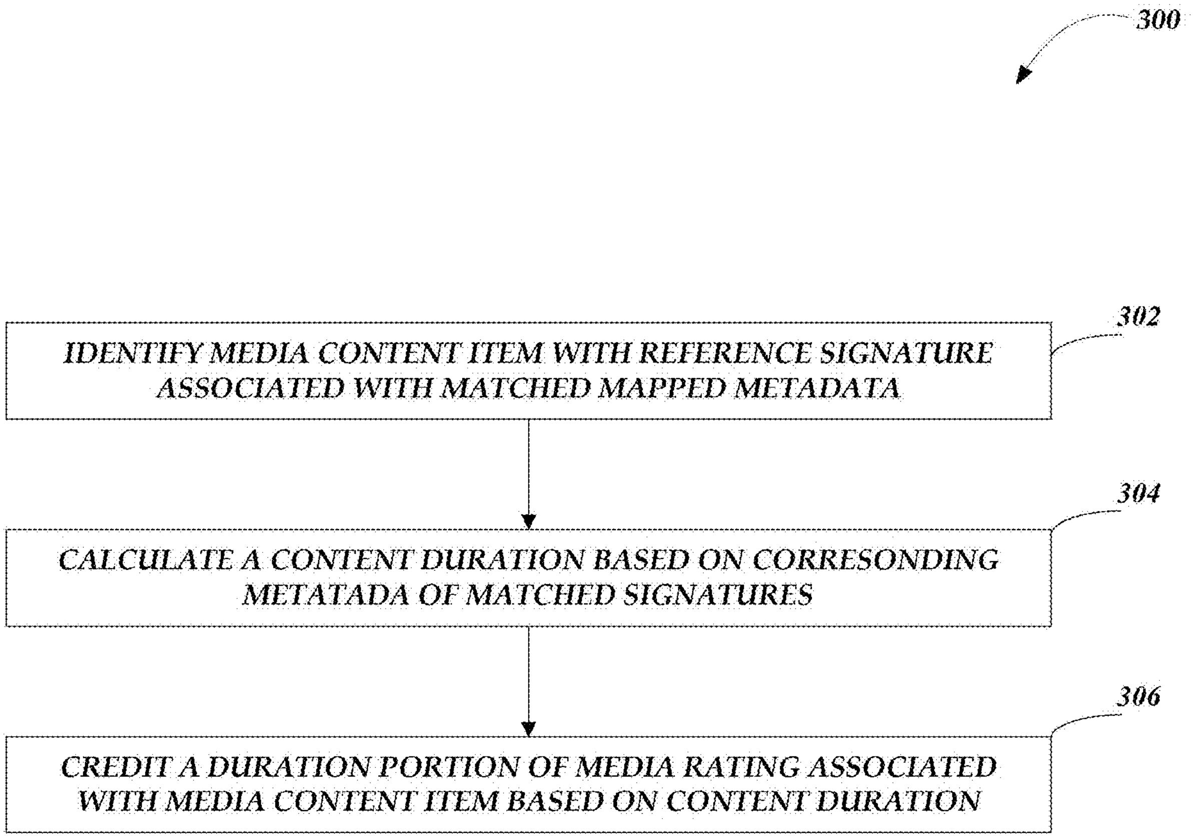
FIG. 3 is a schematic illustration of a method arranged in accordance with examples described herein

FIG. 3 is a schematic illustration of a method 300 arranged in accordance with examples described herein. The method 300 may be implemented by any of the systems or computing devices described herein or combinations thereof. The method 300 starts at step 302. At step 302, a computing device, implementing method 300, identifies a media content item with a reference signature associated with matched mapped metadata. The processor(s) 106 of the media manager computing device 102 can execute executable instructions to credit media content item based on matched signatures 116. For example, as described with respect to FIG. 1, in a system 100, a media manager computing device 102 obtains a watermarked streaming media content item 134. Accordingly, in executing the executable instructions to credit media content item based on matched signatures 116, at step 302, the media manager computing device 102 can be caused to identify a media asset for the watermarked streaming media content item 134 with the associated media asset identifier of the matched signature. In some implementations, execution of step 302 may be analogous to execution of step 216 of the method 200. For example, in executing executable instructions to match tagged signatures to mapped reference signatures 114, the media manager computing device 102 may have determined that an obtained signature of the watermarked streaming media content item 134 was matched with a particular reference signature(s) stored in the reference signature database 120. Accordingly, because the matched signature is associated with a media asset identifier, at step 302, the media manager computing device 102 is caused to identify the media asset that is associated with the watermarked streaming media content item 134 using that media asset identifier. In an example, the media asset identifier can also be associated with a media content rating for that media asset, e.g., as stored in media content rating database 145.

At step 304, once a media content rating for that media asset has been identified, the processor(s) 106 of the media manager computing device 102 can continue to execute executable instructions to credit media content item based on matched signatures 116, to calculate a content duration based on corresponding metadata of the matched signature(s). The media manager computing device 102 can be caused to calculate the duration for watermarked streaming media content item 134 based on the lowest value timestamp among the matched signatures and the highest value timestamp among the matched signatures. For example, the media manager computing device 102 can be caused to identify the mapped metadata associated with obtained signatures of the watermarked streaming media content item 134 that were matched to the reference signatures stored in the reference signature database 120. Accordingly, the media manager computing device 102 can calculate the content duration to be the difference of the starting TIC of watermark metadata associated with the matched signature having the lowest timestamp the ending TIC of the watermark metadata associated with the matched signature having the highest timestamp. Additionally or alternatively, the media manager computing device 102 can calculate the content duration to be the sum of TIC ranges for each obtained signature(s) that was matched to a corresponding TIC range, or duration, of watermark metadata for the watermarked streaming media content item 134.

At step 306, once a content duration has been calculated, the processor(s) 106 of the media manager computing device 102 can continue to execute executable instructions to credit media content item based on matched signatures 116, to credit a duration portion of a media rating associated with the media content item based on the calculated content duration. For example, a media rating stored in the media content rating database 145 and index in accordance with a media asset identifier, can include duration portions that may be credited for presenting or viewing of the watermarked streaming media content item 134. For example, a duration portion may be a time between advertisements or commercial breaks. The watermarked streaming media content item 134 may have been identified as a media asset that is a TV show presented on a Peacock app of the smartphone 126. Accordingly, the calculated content duration of the watermarked streaming media content item 134 can be used to credit particular duration portions of the media rating. For example, the calculated content duration, as indexed by timestamps that were matched to reference signatures, may be aligned with varying duration portions of the media rating. When the aligned duration portions overlap, the media manager computing device 102 can be caused to provide an output that indicates the media rating associated with a duration portion of associated with the media content item is to be credited and stored in the media content rating database 145. Accordingly, the media manager computing device 102 can provide crediting of media content items (e.g., for a media rating of the media content item), which may facilitate crediting of media content using mapped metadata of reference signatures while also reducing computational time at a media manager computing device 102. The method 300 ends after step 306.

The steps included in the example methods 200 and 300 are for illustration purposes. In some embodiments, the steps may be performed in a different order. In some other embodiments, various steps may be eliminated. In still other embodiments, various steps may be divided into additional steps, supplemented with other steps, or combined together in fewer steps. Other variations of these specific steps are contemplated, including changes in the order of the steps, changes to the steps being split or combined into other steps, etc. For example, at step 306 of method 300, an additional aspect to the step can be added or supplemented related to the source identifier. The processor(s) 106 of the media manager computing device 102 can continue to execute executable instructions to credit media content item based on matched signatures 116, to credit a duration portion of a media rating associated with the media content item based on the calculated content duration and also a source identifier associated with that media content item. In the example, the watermarked streaming media content item 134 may have been identified via a source identifier as a media asset that is associated with a Peacock app source (e.g., via a watermarked TV show presented on the Peacock app of the smartphone 126). Accordingly, the calculated content duration of the watermarked streaming media content item 134 can be used to credit particular duration portions of the media rating related to a source of the streaming media content item 134. For example, the calculated content duration, as indexed by timestamps that were matched to reference signatures, may be aligned with varying duration portions of the media rating and associated with the source of the streaming media content item 134 based on the source identifier. When the aligned duration portions overlap, the media manager computing device 102 can be caused to provide an output that indicates the media rating related to the source of the streaming media content item 134 and associated with a duration portion of associated with the media content item is to be credited and stored in the media content rating database 145. Accordingly, the media manager computing device 102 can provide crediting of media content items related to sources of media content items, which may facilitate crediting of media content using mapped metadata of reference signatures while also reducing computational time at a media manager computing device 102. In various implementations, the media manager computing device 102 can provide a crediting output of one or more media rating for various media content item, such as a graphical illustration of the media rating according to media asset, media source, or any combination thereof. For example, the media manager computing device 102 can cause display of a graphical representation of the crediting output from the media content ratings database 145.

Figure 4:
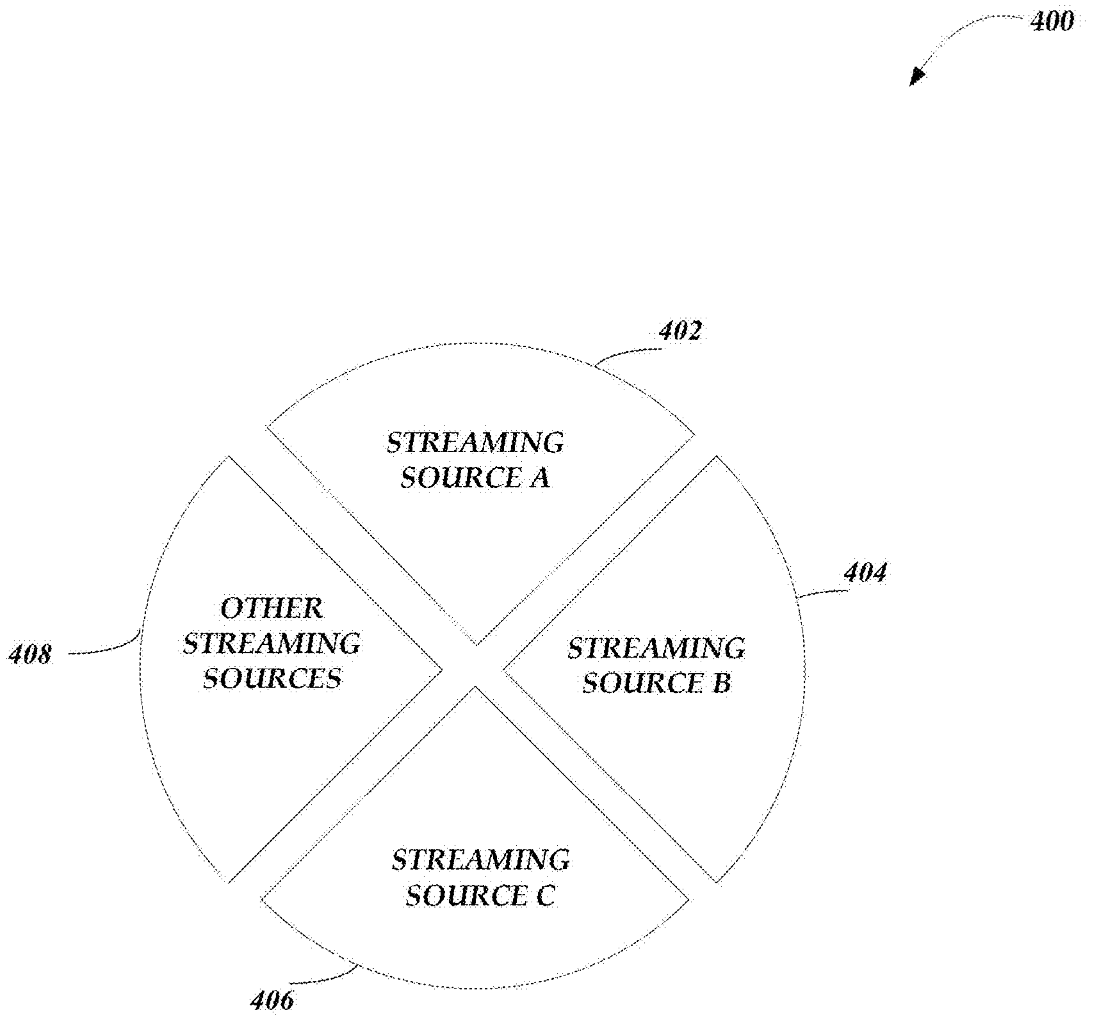
FIG. 4 is a graphical illustration of a crediting output from a method or system in accordance with examples described herein.

FIG. 4 is a graphical illustration 400 of a crediting output of media ratings by the media manager computing device 102 for media content items related to the sources of the media content items. As depicted in the graphical illustration, media content items may be aggregated, from the media content ratings database 145, according to various sources of media content items, e.g., as streaming source A 402, streaming source B 404, streaming source C 406, and other streaming media sources 408. A source of media content items (e.g., as identified by a source identifier) can include a streaming media source such as Netflix, Amazon Prime Video, Disney+, Hulu, Tubi, Pluto TV, Roku Channel, YouTube, Paramount +, Peacock, etc. For example, in the context of FIG. 1., a user of the user computing device 122 (e.g., a media content consumer) may be accessing a streaming media content application on their smartphone (e.g., Netflix, Max, Hulu, Disney+) to access streaming media content item 130; and a user of the user computing device 126 (e.g., another media content consumer) may be accessing a streaming media content application with watermarked streaming media content on their smartphone (e.g., Paramount+, Peacock) to access watermarked streaming media content item 134. In some embodiments, the streaming media content item 130 or the watermarked streaming media content item 134 is transmitted from a media source to the user computing device 122 or the user computing device 126 using one or more data transport streams in accordance with one or more network streaming communication protocols, such as Dynamic Adaptive Streaming over HTTP (DASH), HTTP live streaming (HLS), Real-time Transport Protocol (RTP), etc.

Figure 5:
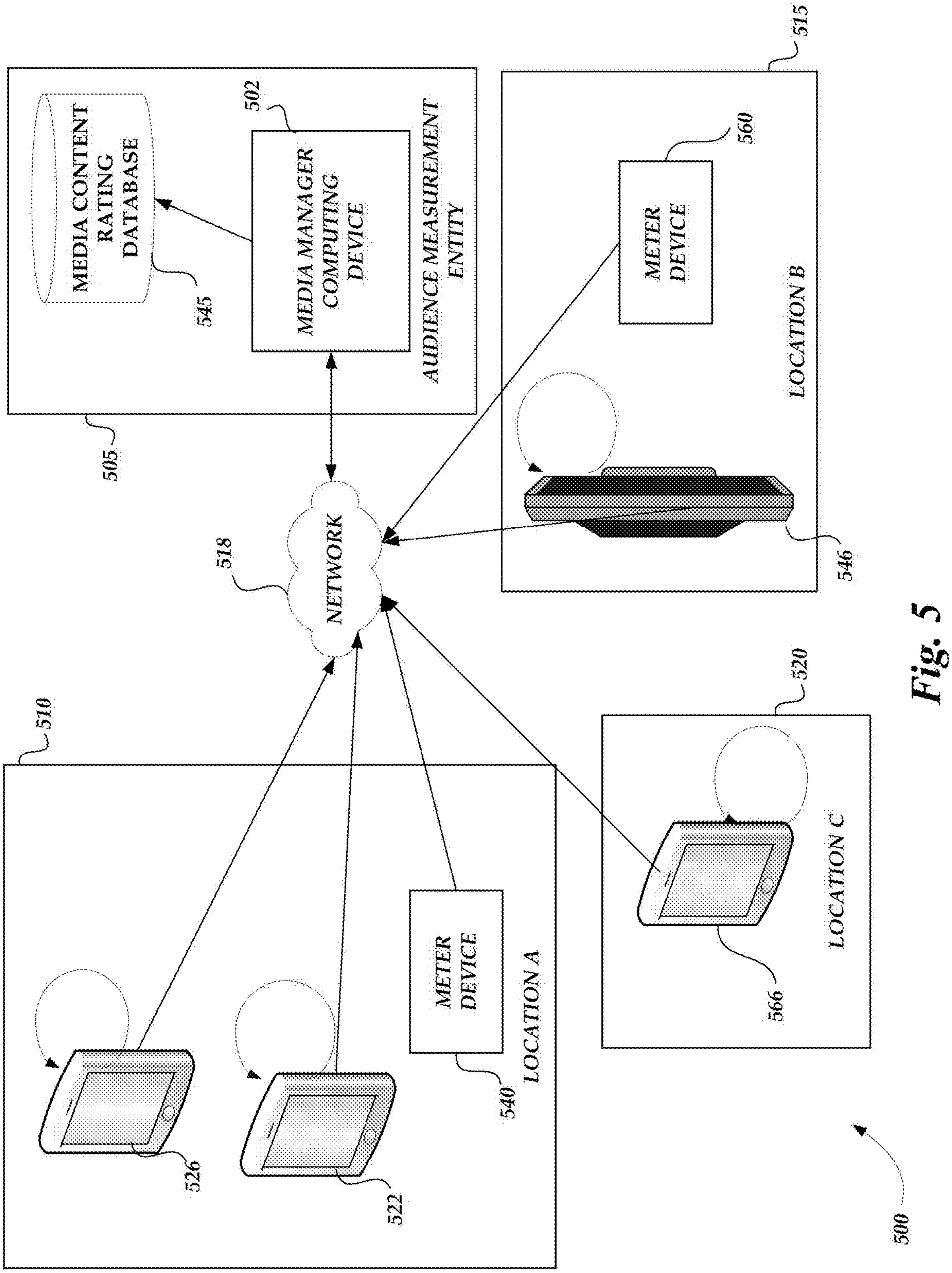
FIG. 5 is a schematic illustration of a system arranged in accordance with examples described herein.

FIG. 5 is a schematic illustration of a system 500 arranged in accordance with examples described herein. The system 500 includes audience measurement entity ("AME") 505, location A 510, location B 515, and location C 520. Audience measurement entity 505 includes a media manager computing device 502 and media content rating database 545. AMEs, such as The Nielsen Company (US), LLC, can extrapolate ratings (e.g., like those stored in media content rating database 545), rating metrics, and/or other audience measurement data for a total television viewing audience from a sample of panel locations. The panel locations can be chosen to be representative of an audience universe as a whole. In the context of system 500, location A 510, location B 515, and location C 520 can represent panel locations, whether those locations are in a household, office, restaurant, or any other location where media content can be presented or consumed by users of user computing devices; like user computing devices 522 and 526 in location A 510, user computing device 546 in location B 515, or user computing device 566 in location C 520. Data indicative of media content items presented on the various computing devices of system 500 can be transmitted back to the AME 502 and the media manager computing device 502 via network 518. For example, network 518 may operation in analogous fashion to that of network 118 and capable of providing any data provided by user computing devices 122 and 126 to media manager computing device 102 in analogous fashion to media manager computing device 502 of the AME 505. While depicted in system 500 as the media manager computing device 502 and media content ratings database 545 as residing the same physical location of the AME 505 (e.g., the AME 505 may be representative of a physical datacenter owned by the AME 505), it can be appreciated that media manager computing device 502 and the media content ratings database 545 could be located in a different physical locations, such that personnel employed by the AME 505 could physically access the premises of wherever the media manager computing device 502 or media content ratings database 545 may be physically located.

The user computing devices 522 and 526, along with meter device 540 in Location A 510 are analogous in operation to that of user computing devices 122 and 126 and meter device 140. Accordingly, in analogous fashion, user computing devices 522, 526, and 566 can present media content streams like streaming media content item 130 and watermarked streaming media content item 134. And, as described with respect to user computer devices 122 and 126, each of user computing devices 522, 526, and 566 can be any of a smartphone, a laptop, a tablet computing device, an Internet-connected television, a streaming computing device, or a computing device configured to present media content streams. For example, an Internet-connected television can also be an audio-content recognition (ACR) television that provides ACR functionalities in part via the Internet (e.g., network 518). An example of such a device is smart TV 546 that is configured to connect to network 518. The smart TV 546 can also present media content streams like streaming media content item 130 and watermarked streaming media content item 134.

Generally described, meter devices, like meter devices 540 and 560, can monitor audio, video and/or images of a media presentation device and collect media identification information embedded in (or generated based on) the audio, video, and/or images of the media content stream which may include one or more media content items. For example, the media identification data can be collected by, for example, listening for audio presented within an environment of the meter 540 with a microphone and/or by capturing images of a video presented on the media presentation device via a camera or sensor. In some examples, a meter device 540 monitors the user computing device 522 to detect audio signal(s) when media content is presented on the user computing device 522. In such examples, the meter device may generate and/or transmit the identification information indicative of a streaming media content item presented on the user computing device 522 via the network 518 to the media manager computing device 502. The meter device 540 can use a microphone of the meter device 540 detect an audio signal of the streaming media content item and transmit a portion or all of the audio signal as identification information indicative of the streaming media content item to the media manager computing device 502 via the network 518. The meter device 540 can extract or generate signatures from the audio signal(s) to be provided as identification information indicative of the streaming media content item. Additionally, the meter device 540 can transmit data indicative of watermarked streaming media content item (e.g., watermark metadata) to the media manager computing device 502 via the network 518.

Analogous to that of meter device 540, the meter device 560 may use a microphone of the smart TV 546 to detect an audio signal of a streaming media content item and transmit a portion or all of the audio signal as identification information indicative of the streaming media content item to the media manager computing device 502 via the network 518. The meter device 560 monitors the smart TV 546 to detect audio signal(s) when media content is presented on the smart TV 546. Additionally, the meter device 560 can transmit data indicative of watermarked streaming media content item (e.g., watermark metadata) to the media manager computing device 502 via the network 518.

In some examples, a meter device may be referred to as a panelist meter such as the user computing device 566 installed with certain panelist software capable of transmitting a portion or all of the audio signal as identification information indicative of a streaming media content item or data indicative of watermarked streaming media content item (e.g., watermark metadata) to the media manager computing device 502 via the network 518. Accordingly, the user computing device can present media content streams and also monitor such media content streams via installed panelist software.

The media manager computing device 502 and media content rating database 545 are analogous in operation to that of media manager computing device 102 and media content rating database 145. Accordingly, in analogous fashion to that of executable instructions to map watermark metadata to tagged signatures, the media manager computing device 502 performs operations to map a source identifier and a duration to one or more signatures associated with one or more watermarked streaming media content items. Additionally and analogously, media manager computing device 502 can perform operations to match tagged signatures to mapped reference signatures, e.g. being caused to perform certain operations when executable instructions to match tagged signatures to mapped reference signatures are executed by one or more processors. And the media manager computing device 502 can perform operations to credit media content items based on matched signatures. For example, the media manager computing device 502 can be caused to provide an output that indicates a media rating associated with a duration portion of the media content item (e.g., a watermarked streaming media content item(s)) to be stored in the media content rating database 545. In an example implementation, the output stored in the media content rating databased 545 can also be based on the duration portion of the media content item and also based on a source identifier associated with that media content item. Accordingly, the graphical illustration 400 of a crediting output of media ratings can also be representative of an output by the media manager computing device 502 that can be stored in media content ratings database 545.

Advantageously, the system 500, with user computing devices 522, 526, 546 and the smart TV 546 at various locations (e.g., Location A 505, Location B 510, and Location C 515) reflects an improvement to the audience measurement technical field, an inherently technical endeavor involving streaming media content items and watermarked streaming media content items. For example, the system 500 provides a particular solution to an audience measurement problem arising in the audience measurement technical field because the system 500 facilitates, advantageously, ratings generated by an AME (e.g., those ratings stored in media content rating database 545) while processing the numerous media content streams, including watermarked media content streams. In the example, the operations provided by the media manager computing device 502 facilitate such a particular solution, including, for example: obtaining, at a media manager computing device, a media content item with identification information including watermark data and one or more signatures, the watermark data having a source identifier and a plurality of timestamps associated with the media content; mapping, at the media manager computing device, the source identifier and a duration based on the plurality of timestamps to each of the one or more signatures as a respective tagged signature of one or more tagged signatures, each having a mapped source identifier and a mapped duration, respectively; comparing, at the media manager computing device, a mapped source identifier and a mapped duration of at least one of the one or more tagged signatures to a mapped reference source identifier and a mapped reference duration of one or more reference signatures; and based on the comparison, determining, at the media manager computing device, that at least one of the one or more tagged signatures match one of the one or more reference signatures to identify as one or more matched signatures.

As another aspect to system 500 providing a particular solution to an audience measurement problem arising in the audience measurement technical field, system 500 facilitates, advantageously, the capability of processing data from various types of user computing devices (e.g., user computing devices 522, 526, 546 and the smart TV 546) in multiple locations (e.g., Location A 505, Location B 510, and Location C 515). While depicted in FIG. 5 with the user computing devices depicted in certain locations, it can be appreciated that the system 500 can facilitate such processing on more complex and numerous scales; for example, 1000 user computing devices or smart TVs in 1000 different locations, 2 million user computing devices or smart TVs in 1000 different locations; 10 million user computing devices and smart TVs in 5 million different locations; 10 million user computing devices and 10 million smart TVs in 10 million different locations; or 100 million user computing devices or smart TVs in 100 million different locations. Accordingly, the operations provided by the media manager computing device 502 of the AME 505 facilitate such a particular solution as an improvement to the audience measurement technical field.

Figure 6:
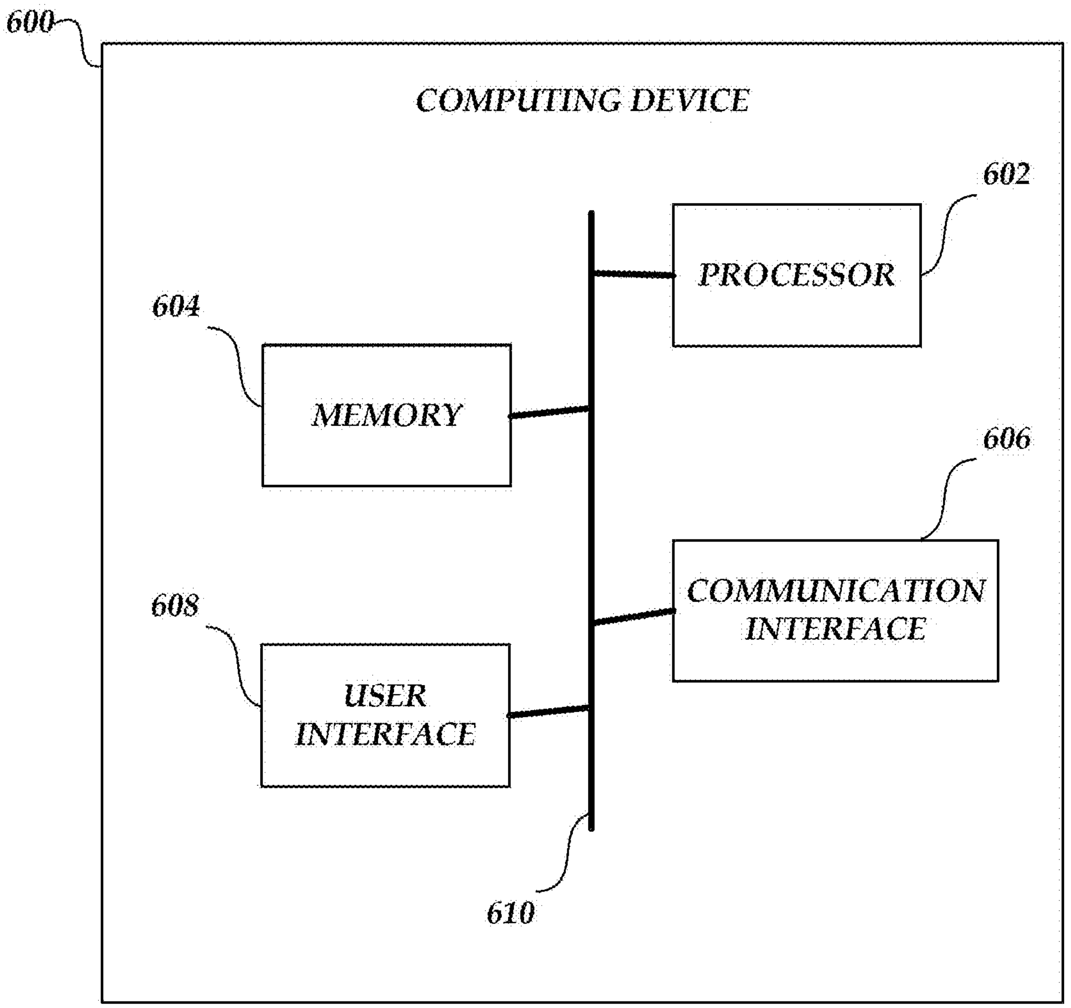
FIG. 6 is a schematic illustration of a computing device arranged in accordance with examples described herein.

FIG. 6 is a schematic illustration of a computing device 600 arranged in accordance with examples described herein. Any one or more of the above-described components, such as the media manager computing device 102 or media manager computing device 502, can take the form of a computing device, or a computing system that includes one or more computing devices. The computing device 600 can be configured to perform one or more operations, such as the operations described in this disclosure. As shown, the computing device 600 can include various components, such as a processor 602, memory 604, a communication interface 606, and/or a user interface 608. These components can be connected to each other (or to another device, system, or other entity) as depicted via a connection mechanism 610.

The processor 602 can include one or more general-purpose processors and/or one or more special-purpose processors.

Memory 604 can include one or more volatile, non-volatile, removable, and/or non-removable storage components, such as magnetic, optical, or flash storage, and/or can be integrated in whole or in part with the processor 602. Further, memory 604 can take the form of a non-transitory computer-readable storage medium, having stored thereon computer-readable program instructions (e.g., compiled or non-compiled program logic and/or machine code) that, upon execution by the processor 602, cause the computing device 600 to perform one or more operations, such as those described in this disclosure. The program instructions can define and/or be part of a discrete software application. In some examples, the media manager computing device 102 can execute the program instructions in response to receiving an input (e.g., via the communication interface 606 and/or the user interface 608). Memory 604 can also store other types of data, such as those types described in this disclosure. In some examples, memory 604 can be implemented using a single physical device, while in other examples, memory 604 can be implemented using two or more physical devices.

The communication interface 606 can include one or more wired interfaces (e.g., an Ethernet interface) or one or more wireless interfaces (e.g., a cellular interface, Wi-Fi interface, or Bluetooth® interface). Such interfaces allow the computing device 600 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 608 can facilitate interaction between computing device 600 and a user of computing device 600, if applicable. As such, the user interface 608 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 608 can include hardware and/or software components that facilitate interaction between the computing device 600 and the user of the computing device 600.

The connection mechanism 610 can be a cable, system bus, computer network connection, or other form of a wired or wireless connection between components of the computing device 600.

One or more of the components of the computing device 600 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 600 can be combined into a single component, and the function described herein for a single component can be subdivided among multiple components.

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:

obtaining, at a media manager computing device, a media content item with identification information including watermark data and one or more signatures, the watermark data having a source identifier and a plurality of timestamps associated with the media content, wherein the watermark data of the media content item is representative of an audio watermark inserted into the media content item by a media content provider, wherein the watermark data of the media content item is inserted into the media content item by the media content provider as an ID3 tag, the ID3 tag including watermark metadata encoded with extensible markup language (XML);

mapping, at the media manager computing device, the source identifier and a duration based on the plurality of timestamps to each of the one or more signatures as a respective tagged signature of one or more tagged signatures, each having a mapped source identifier and a mapped duration, respectively;

comparing, at the media manager computing device, a mapped source identifier and a mapped duration of at least one of the one or more tagged signatures to a mapped reference source identifier and a mapped reference duration of one or more reference signatures;

based on the comparison, determining, at the media manager computing device, that at least one of the one or more tagged signatures match one of the one or more reference signatures to identify as one or more matched signatures;

identifying, with a media content identifier associated with at least one of the matched signatures, the media content item;

calculating, at the media manager computing device, a content duration associated with the one or more matched signatures based on the corresponding mapped reference duration for each of the one or more matched signatures;

crediting, at the media manager computing device, a duration portion of a media rating associated with the media content item based on the content duration; and based on the crediting, outputting, by the media manager computing device, a crediting output of media ratings as a graphical representation of media sources of media content items, the media ratings including the media rating associated with the media content item.

2. The method of claim 1, wherein each of the one or more reference signatures are mapped to a source identifier and a duration associated with reference watermark data.

3. The method of claim 1, wherein mapping, at the media manager computing device, the source identifier and the duration based on the plurality of timestamps comprises:

calculating the duration for the media content including the watermark based on the lowest value timestamp and the highest value timestamp of the plurality of timestamps.

4. The method of claim 1, further comprising:

obtaining a second media content item with identification information including one or more second signatures; and determining, at the media manager computing device, that the obtained identification information of the second media content item does not include watermark data, to compare each of the second signatures with the one or more reference signatures.

5. The method of claim 4, further comprising:

for each second signature, comparing, at the media manager computing device, the at least one second signature of the one or more second signatures to the one or more reference signatures until a signature match is obtained;

based on the comparison, determining, at the media manager computing device, that at least one of the one or more second signatures match one of the one or more reference signatures; and based on the match, identify, at the media manager computing device and with a media content identifier, the second media content item.

6. The method of claim 1, wherein the media content item is a portion of media content that is streaming over a network.

7. The method of claim 1, further comprises:

obtaining, at a user computing device, a media content stream including a plurality of media content items including the media content item.

8. The method of claim 7, wherein the media content stream is streaming video-on-demand provided by the media content provider.

9. The method of claim 7, wherein the user computing device corresponds to a smartphone, a laptop, a tablet computing device, an Internet-connected television, a streaming computing device, a smart TV, or a computing device configured to present media content streams.

10. A method comprising:

obtaining, at a media manager computing device, a media content item with identification information including watermark data and a signature, wherein the watermark data of the media content item is representative of an audio watermark inserted into the media content item by a media content provider, wherein the watermark data of the media content item is inserted into the media content item by the media content provider as an ID3 tag, the ID3 tag including watermark metadata encoded with extensible markup language (XML);

mapping, at the media manager computing device, a source identifier from the watermark data and a duration from the watermark data to the signature as a tagged signature, the tagged signature having a mapped source identifier and a mapped duration; and determining, at the media manager computing device, that the tagged signature matches a reference signature based on the mapped source identifier and the mapped duration of the tagged signature;

identifying, with a media content identifier associated with tagged signature, the media content item;

identifying, with a source identifier associated with tagged signature, a source of the media content item;

crediting, at the media manager computing device, a duration portion of a media rating associated with the media content item based on the content duration and the source identifier, based on the crediting, outputting, by the media manager computing device, a crediting output of media ratings as a graphical representation of media sources of media content items, the media ratings including the media rating associated with the media content item; and providing, from a media content ratings database, the crediting output including at least the source of the media content item associated with the credited duration portion of the media rating.

11. The method of claim 10, further comprises:

obtaining, from a meter device, the watermark data including the source identifier and a plurality of timestamps extracted from a code embedded into the audio signal of the media content item.

12. The method of claim 10, further comprising:

storing, in the media content ratings database, the credited duration portion of the media rating associated with the media content item and the crediting output of the media ratings as the graphical representation of the media sources of the media content items.

13. The method of claim 10, wherein the media content item is a portion of media content that is streaming over a network.

14. A computing system comprising a processor and a memory storing computer executable instructions that when executed cause the computing system to perform a set of operations comprising:

obtaining a media content item with identification information including watermark data and a signature, wherein the watermark data of the media content item is representative of an audio watermark inserted into the media content item by a media content provider, wherein the watermark data of the media content item is inserted into the media content item by the media content provider as an ID3 tag, the ID3 tag including watermark metadata encoded with extensible markup language (XML);

mapping a source identifier from the watermark data and a duration from the watermark data to the signature as a tagged signature, the tagged signature having a mapped source identifier and a mapped duration;

determining the tagged signature matches a reference signature based on the mapped source identifier and the mapped duration of the tagged signature;

identifying, with a media content identifier associated with tagged signature, the media content item;

calculating, at the media manager computing device, a content duration associated with the tagged signature based on a corresponding mapped reference duration for the reference signature;

crediting, at the media manager computing device, a duration portion of a media rating associated with the media content item based on the content duration; and based on the crediting, outputting, by the media manager computing device, a crediting output of media ratings as a graphical representation of media sources of media content items, the media ratings including the media rating associated with the media content item.

15. The computing system of claim 14, wherein the media content item with the identification information is obtained from a user computing device corresponding to a smartphone, a laptop, a tablet computing device, an Internet-connected television, a streaming computing device, or a computing device configured to present media content streams.

16. The computing system of claim 14, wherein the signature is generated from selected frequency bands of a spectral energy distribution of blocks of audio samples of the media content item.

17. The computing system of claim 14, wherein the set of operations further comprises causing display of the graphical representation of the crediting output from a media content ratings database including the duration portion of the media rating.

* * * * *